(12) United States Patent
Hajimiri

(10) Patent No.: US 12,372,637 B1
(45) Date of Patent: *Jul. 29, 2025

(54) WEARABLE APPROACHING OBJECT DETECTION WITH DYNAMIC MOTION COMPENSATION

(71) Applicant: Cavon M Hajimiri, La Canada Flintridge, CA (US)

(72) Inventor: Cavon M Hajimiri, La Canada Flintridge, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,258

(22) Filed: Jan. 26, 2025

Related U.S. Application Data

(60) Provisional application No. 63/625,948, filed on Jan. 27, 2024, provisional application No. 63/729,955, filed on Dec. 10, 2024.

(51) Int. Cl.
| | |
|---|---|
| *G01S 13/50* | (2006.01) |
| *G01P 13/00* | (2006.01) |
| *G01S 13/42* | (2006.01) |
| *G01S 13/93* | (2020.01) |
| *G08B 21/02* | (2006.01) |
| *G08B 21/18* | (2006.01) |
| *G08G 1/005* | (2006.01) |

(52) U.S. Cl.
CPC ............ *G01S 13/50* (2013.01); *G01P 13/00* (2013.01); *G01S 13/42* (2013.01); *G01S 13/93* (2013.01); *G08B 21/02* (2013.01); *G08B 21/182* (2013.01); *G08G 1/005* (2013.01)

(58) Field of Classification Search
CPC .......... G01S 13/50; G01S 13/42; G01S 13/93; G01P 13/00; G08B 21/02; G08B 21/182; G08G 1/005
USPC ....................................................... 340/686.6
See application file for complete search history.

(56) References Cited

U.S. PATENT DOCUMENTS

| | | | |
|---|---|---|---|
| 4,725,840 A | 2/1988 | Orazietti | |
| 6,731,202 B1 | 5/2004 | Klaus | |
| 7,079,024 B2 | 7/2006 | Alarcon | |
| 7,132,975 B2* | 11/2006 | Fullerton | ............ G01S 13/0209 342/107 |
| 9,315,150 B2 | 4/2016 | Rashid et al. | |
| 9,457,709 B2 | 10/2016 | Alataas | |
| 9,655,390 B2 | 5/2017 | Davis | |
| 9,989,637 B2 | 6/2018 | Rashid et al. | |
| 10,037,670 B2 | 7/2018 | Lin et al. | |
| 10,086,894 B2 | 10/2018 | Arkhangelskiy et al. | |
| 10,371,809 B2* | 8/2019 | Satou | ...................... G01S 13/60 |
| 10,393,872 B2 | 8/2019 | Brisimitzakis et al. | |

(Continued)

*Primary Examiner* — Zhen Y Wu

(57) ABSTRACT

A wearable system for pedestrians/users is adapted to detect threats posed by, for example, approaching vehicles, bikers, and issue an alert. The wearable system may include an inertial measurement unit to measure the gait of the pedestrian and actively adjust alert generation thresholds to account for the noisy and large movements of the gait using present and past IMU data. The thresholds can be raised during active phases of the gait, and lowered in the quieter (i.e., less active) phases of the gait, keeping the range, and therefore time to react, relatively steady with respect to the pedestrian/user's motion. The alert generation threshold may be combined with the processed receiver data to determine threats and alert the pedestrian/user using any combination of haptic, audio, vibrational, or visual outputs.

20 Claims, 13 Drawing Sheets

(56) References Cited

U.S. PATENT DOCUMENTS

| | | | |
|---|---|---|---|
| 10,527,722 B2 | 1/2020 | Carlson et al. | |
| 10,539,658 B2 * | 1/2020 | Zivkovic | G01S 13/343 |
| 10,723,351 B1 | 7/2020 | Hakki et al. | |
| 11,049,380 B2 | 6/2021 | Kaindl | |
| 11,237,248 B2 * | 2/2022 | Alcalde | G01S 13/931 |
| RE49,232 E | 10/2022 | Strickland et al. | |
| 11,709,224 B2 * | 7/2023 | Hakobyan | G01S 13/343 |
| | | | 342/113 |
| 12,222,440 B2 * | 2/2025 | Tapia | G01S 13/931 |
| 2009/0033475 A1 | 2/2009 | Zuziak et al. | |
| 2011/0267219 A1 * | 11/2011 | Kisliansky | G01S 13/426 |
| | | | 342/159 |
| 2013/0001422 A1 * | 1/2013 | Lavon | G01S 13/42 |
| | | | 250/393 |
| 2013/0127638 A1 | 5/2013 | Harrison | |
| 2015/0228066 A1 | 8/2015 | Farb | |
| 2015/0332563 A1 | 11/2015 | Davis | |
| 2016/0011299 A1 * | 1/2016 | Satou | G01S 13/931 |
| | | | 342/70 |
| 2016/0103206 A1 * | 4/2016 | Pavao-Moreira | G01S 13/325 |
| | | | 342/104 |
| 2016/0245911 A1 * | 8/2016 | Wang | G01S 7/2927 |
| 2017/0160391 A1 * | 6/2017 | Satou | G01S 13/93 |
| 2017/0248686 A1 * | 8/2017 | Zivkovic | G01S 7/352 |
| 2019/0204435 A1 | 7/2019 | Poiger et al. | |
| 2019/0292837 A1 | 9/2019 | Koravadi | |
| 2020/0064441 A1 * | 2/2020 | Alcalde | G01S 13/58 |
| 2020/0191952 A1 | 6/2020 | Makinen et al. | |
| 2021/0287546 A1 | 9/2021 | Englander et al. | |
| 2022/0065991 A1 * | 3/2022 | Zhang | G01S 13/931 |
| 2023/0194661 A1 * | 6/2023 | Tapia | G01S 13/42 |
| | | | 342/169 |
| 2024/0248202 A1 * | 7/2024 | Park | G01S 15/101 |

* cited by examiner

WEARABLE APPROACHING OBJECT DETECTION WITH DYNAMIC MOTION COMPENSATION

CROSS-REFERENCE TO RELATED APPLICATIONS

The current application claims priority to U.S. Provisional Patent Application No. U.S. 63/625,948, entitled "Wearable Approaching Object Detection" and filed Jan. 27, 2024, and U.S. Provisional Patent Application No. U.S. 63/729,955, entitled "System and Method for Active Detection of Incoming Objects" and filed Dec. 10, 2024. The disclosures of U.S. Provisional Patent Application Nos. 63/625,948 and 63/729,955 are incorporated by reference herein in their entireties.

TECHNICAL FIELD

The present invention relates generally to wearable approaching object detection sensors and more specifically to approaching object detection systems with dynamically adaptive detection algorithms for moving, shaking, and vibrating users.

BACKGROUND

According to the United States Department of Transportation, on average, every eight minutes a car hits a pedestrian, and every 70 minutes one person is killed in a car accident. Many of these accidents happen because the pedestrian is unaware of the incoming vehicle. The situation is even more challenging for people with hearing, visual, and other sensory impairments and elderly whose response time may have been degraded. Also, use of headphones and noise cancellation technology further impedes the pedestrian's ability to notice a car approaching from behind. Additionally, noisy environments and quieter vehicles, such as electric cars, can make it more challenging for the pedestrian to hear approaching vehicles in time to react.

Several sensing approaches using acoustic, lidar, radar, and camera detection of approaching cars have been proposed for bicyclists. However, bicycles present a much more stable environment for such sensors compared to walking and particularly running. Approaching vehicle sensors for bicycles that use radar on expensive high-performance board materials for cyclists are still subject to desensitization and false alarms if adopted for the very active environment experienced by a walker, jogger, or runner. Movements and vibration during walking, jogging, and running can produce erroneous sensor readings and significantly degrade the sensor performance and increase the probability and frequency of false alarms and/or reduce the detection range. Walkers and runners require a solution that combines the long-range detection information with locally extracted movement data to enhance the detection accuracy and range and reduce false alarms due to vibration and shaking of the user.

The computational complexity of the detection algorithms plays a significant role in the battery life, cost, and reliability of wearable systems. A low-complexity signal processing is desirable in such systems. Intense signal processing and expensive high-frequency boards and components can lead to higher power consumption, lower battery life, and more expensive sensors, limiting its usability.

Making wearable sensors accessible to a broader range of users requires an architecture compatible with low-cost and high-volume manufacturing. Wide availability for pedestrians requires a solution that is optimized to account for the erratic movements seen in pedestrians and preferably compatible with low-cost high-volume manufacturing. Despite this, the proposed solutions should maintain the option to use high-performance substrates and components to achieve even better results if necessary.

Doppler radar has been used extensively for movement detection in various applications. It is very effective in detecting small changes in the reflection from the surroundings that appear as low-frequency signals when the reflections are down-converted with the same local oscillator used in the transmitters. Doppler radar is widely used as a motion detector in security and convenience applications, heart rate and breathing monitors in biomedical sensing, and cloud and precipitation detection in weather forecasting. In all these applications, the sensor itself is stationary. In many of these applications, the sensor does not need to differentiate between approaching or departing objects. Because of their design for stationary sensor usage, traditional Doppler radar solutions are ineffective when both the user and the sensor are in motion with possible shaking and vibration not distinguishable from the approaching object.

SUMMARY

Systems and methods in accordance with various embodiments of the invention detect, classify, and alert the user to approaching objects, such as vehicles coming from behind, in real time, to avoid collisions by identifying the appropriate received reflection signatures, such as frequency, polarity, and amplitude components, etc. in the presence of movement, vibrations, and shaking of the sensor itself, ensuring adaptive sensitivity based on user movement and environmental context In some embodiments of the inventions, the system uses on-board sensors, such as accelerometers, gyroscopes, and magnetometers, to obtain information about gait parameters, such as the current nature of the gait, such as standing, walking, jogging, or running and adaptively adjust the parameters of detection, such as thresholds, numbers of events, magnitudes, etc., according to the current modality of use (nature of the gait) to avoid false positives while maximizing sensitivity and detection range.

Utilizing the information about other gait parameters, such as the exact phase of the gait, in accordance with many embodiments of the invention, provides additional sensitivity while minimizing the probability of false positives. In some embodiments of the invention, the detection parameters are dynamically adjusted during the course of a single step taken by the pedestrian to match the phase of the gait, as certain phases of taking a step produce larger background Doppler shifts due to the relatively larger at those instances. The detection parameters, such as thresholds, numbers of events, magnitudes, etc., are dynamically increased and decreased during different phases of each step. The detection parameters are dynamically lowered in real time during the quieter phases of the cycle to achieve higher sensitivity and range and raised during the more active parts of the gait cycle to avoid false positives due to movements.

A wearable approaching object detection sensor in accordance with many embodiments of the invention operate reliably in moving, shaking, and vibrating environments due to the adaptive and dynamic detection parameters adjustment based on local dynamics status monitoring. They can also be highly suitable for environments with various stationary and moving objects, which can be prominent in outdoor applications on surface streets and roads. Also due to its option to operate adaptively and dynamically, false positives can be significantly reduced, while producing significantly longer detection ranges and earlier detection times providing the pedestrian more time to respond. Additionally, the low computational complexity of the signal processing, a lower power consumption and longer battery life can be achieved using lower-cost processors, analog and radio frequency (RF) components, and substrates.

A microwave sensor worn on a pedestrian's back while walking, jogging, or running forward on a street receives reflected microwaves from the road, surroundings, and various objects present, resulting in a Doppler shifts due to the movement of the pedestrian. The amount of the Doppler shift varies due to the varying instantaneous velocity of the pedestrian during different phases of the gait cycle. Also, not all reflecting objects are directly facing the sensor and instead have different angles θ relative to the sensor, thus causing different Doppler frequency shifts. This results in Fourier frequency components at all speeds below the pedestrian's speed due to modification of the radial velocity because of the cos θ reflected component.

Also, a simple double sideband received signal does not differentiate between positive (approaching) and negative (departing) Doppler shifts of the same magnitude. To differentiate approaching cars from all other stationary and moving objects, in accordance with a number of embodiments of the invention a quadrature receiver that can provide both in-phase (I) and quadrature (Q) Doppler outputs can be utilized. This is because in the sensor's frame of reference, everything is receding with a negative Doppler shift (red shift) except approaching vehicles, which have a positive Doppler shift (blue shift).

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Figure 1:
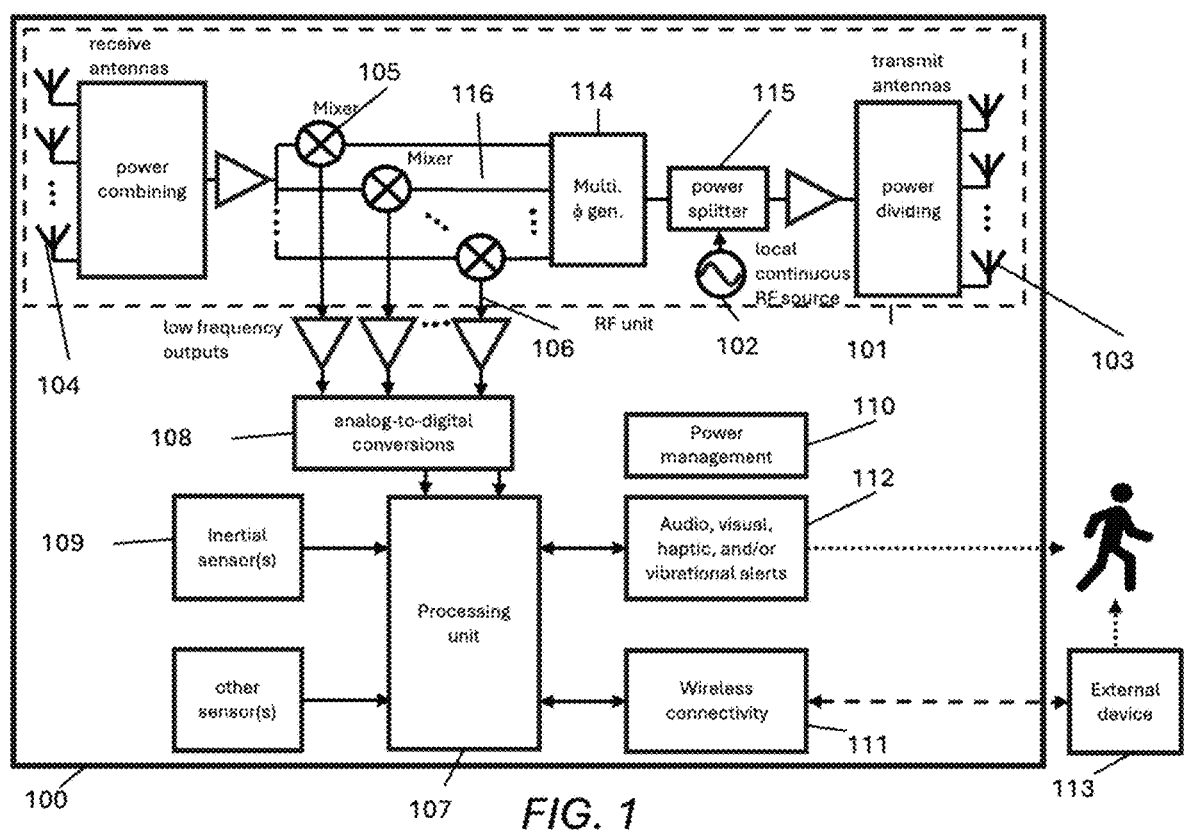
FIG. 1 shows an example of a multi-phase embodiment capable of alerting the user of incoming vehicles.

Aspects of the present disclosure are directed to approaching object detection systems and methods adapted to detect potentially hazardous approaching vehicles, and alerting the user about the detected vehicles. As conceptually illustrated in FIG. 1, an approaching object detection system 100 in accordance with various embodiments of the invention includes, in part, one or more radio frequency (RF) unit 101 that can include a local continuous RF source 102 generating an RF output that drives an RF transmitter, which can include at least one antenna element 103 that are synchronized to the local continuous RF source; and an RF receiver that can include at least one antenna element 104 and any number of mixers 105 driven synchronously by different phases of the local continuous RF source that can generate low-frequency outputs 106. System 100 is also shown as including, in part, a processing unit 107, one or more analog-to-digital converters 108, inertial measurement unit 109, power management 110, and/or wireless connectivity components 111 to communicate to an external device 113, and alert generation for the pedestrian using any combination of haptic, audio, or visual outputs 112. The output of the local continuous RF source 102 can also be divided by a power splitter 115 that can also feed a multi-phase generation network 114.

The reflected transmitter signals from various objects exhibit signatures associated with movements of both the approaching object detection system 100 itself, as well as the object(s) being detected. An inertial measurement unit 109, periodically measures inertial movements, vibration, and/or rotational parameters of the detection system 100 and uses the processing unit 107 that executes a decision-making algorithm with information regarding movement, shaking, vibrations, and or rotation of the system to enhance the accuracy of any combination of alerts (such as audio, visual, haptic, vibration, etc.) by internal alert generation component 112, or by external alert generation component 113 when an approaching object is detected.

Figure 2:
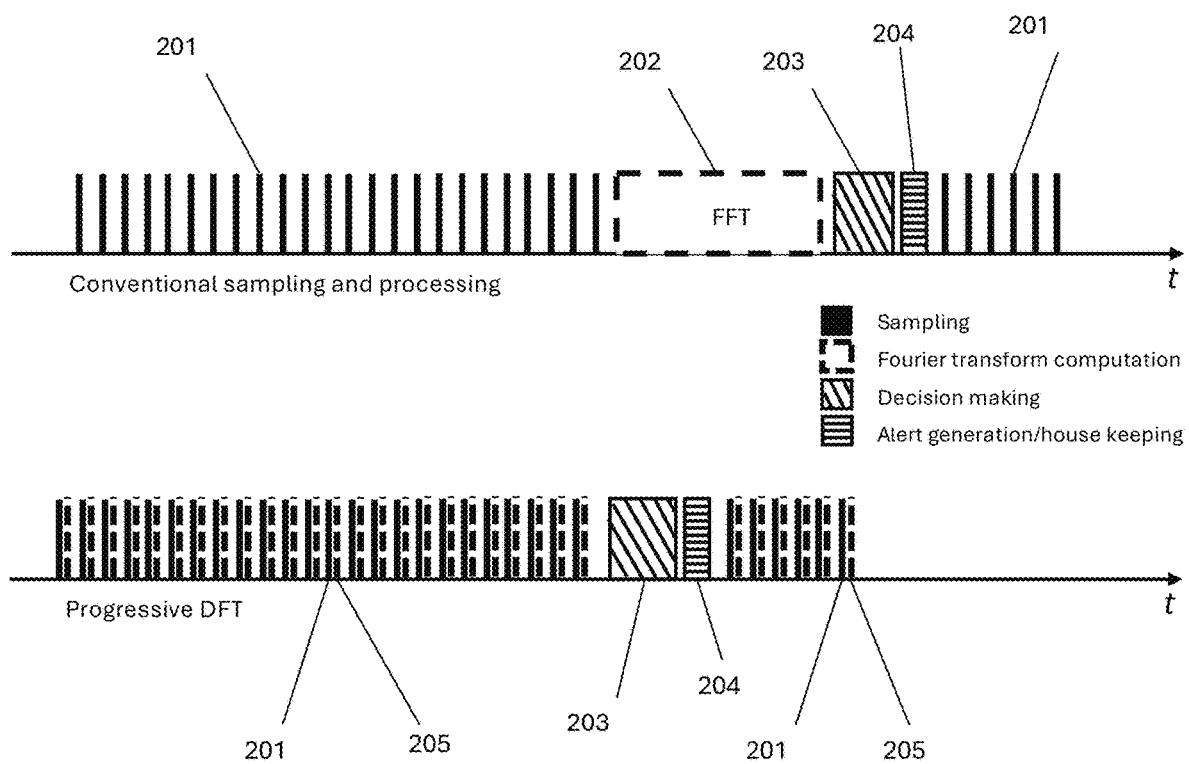
FIG. 2 shows a visualization of the progressive discrete Fourier transform in the time domain.

In some embodiments of the invention, as illustrated in FIG. 2, processing unit 107 is adapted to use the idle times between analog-to-digital converter's samples 201 to perform progressive discrete Fourier transform 205 on some or all of the digitized low-frequency outputs of the RF unit to generate complex-valued arrays containing the real and imaginary values for different frequency components of some or all of the digitized low-frequency outputs. The progressive discrete Fourier transform incrementally computes spectral components in real time, reducing computational overhead and enhancing response time. In some conventional embodiments all samples 201 are taken and stored before a fast Fourier transform algorithm 202 is executed followed by decision-making 203 for alert generation 204. The ability to process progressive DFT Fourier transform 205 during the idle operation times can reduce the time durations over which the system is not sampling and processing information from the reflections due to various elements in the environment and thus advantageously improves the detection speed and lower the probability of a false negative by missing an approaching object, and further, by reducing the power consumption enhances the battery life time in embodiments that are battery operated.

Figure 3:
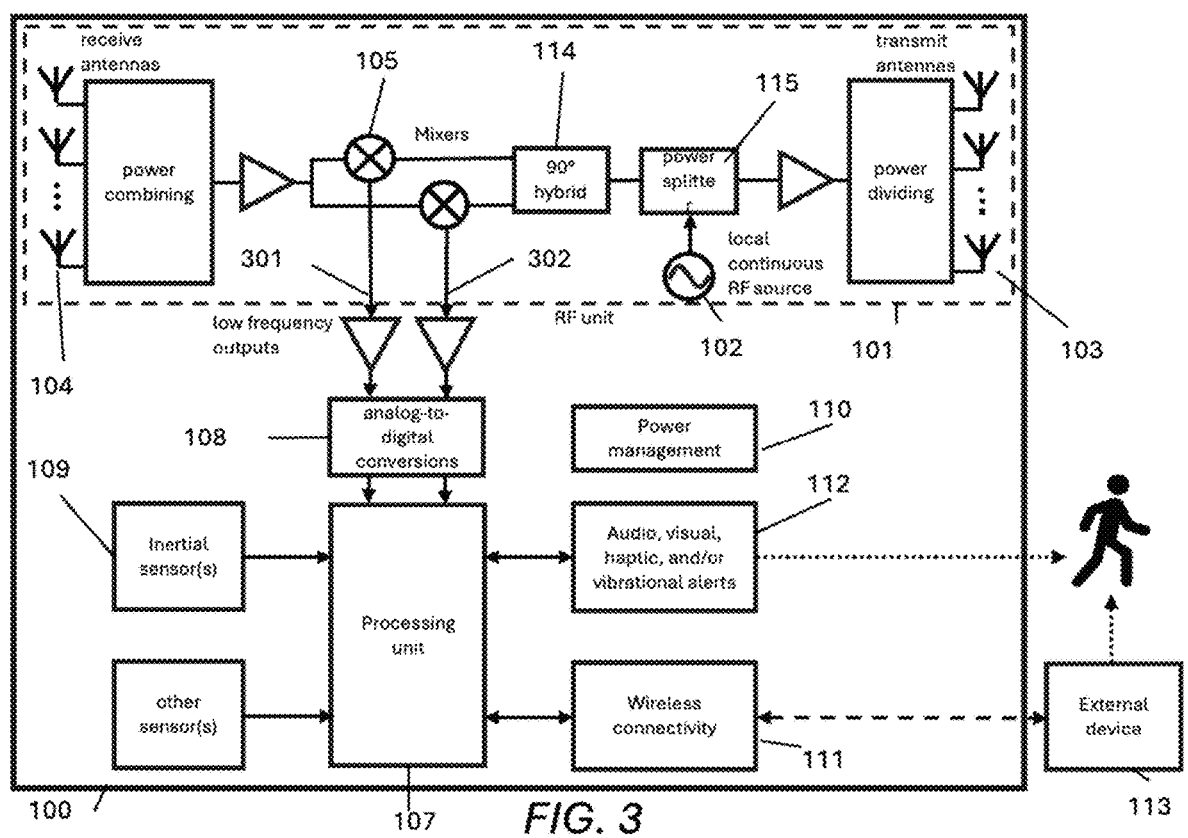
FIG. 3 shows an example schematic of an in-phase and quadrature embodiment capable of alerting the user of incoming vehicles.

In several embodiments, mixers 105 driven by different phases 116 of local continuous RF source 102 can be used to generate several low-frequency outputs that can be digitized by analog-to-digital converters 108 and processed by the processing unit 107 to determine information such as (but not limited to) direction of relative motion, speed, and size of a detected object. Referring to FIG. 3, in some embodiments, the mixers 105 can be driven synchronously with phases of the local continuous RF source that are approximately 90 degrees apart to generate in-phase 301 and quadrature 302 digitized low-frequency outputs that can be separately processed.

Figure 4:
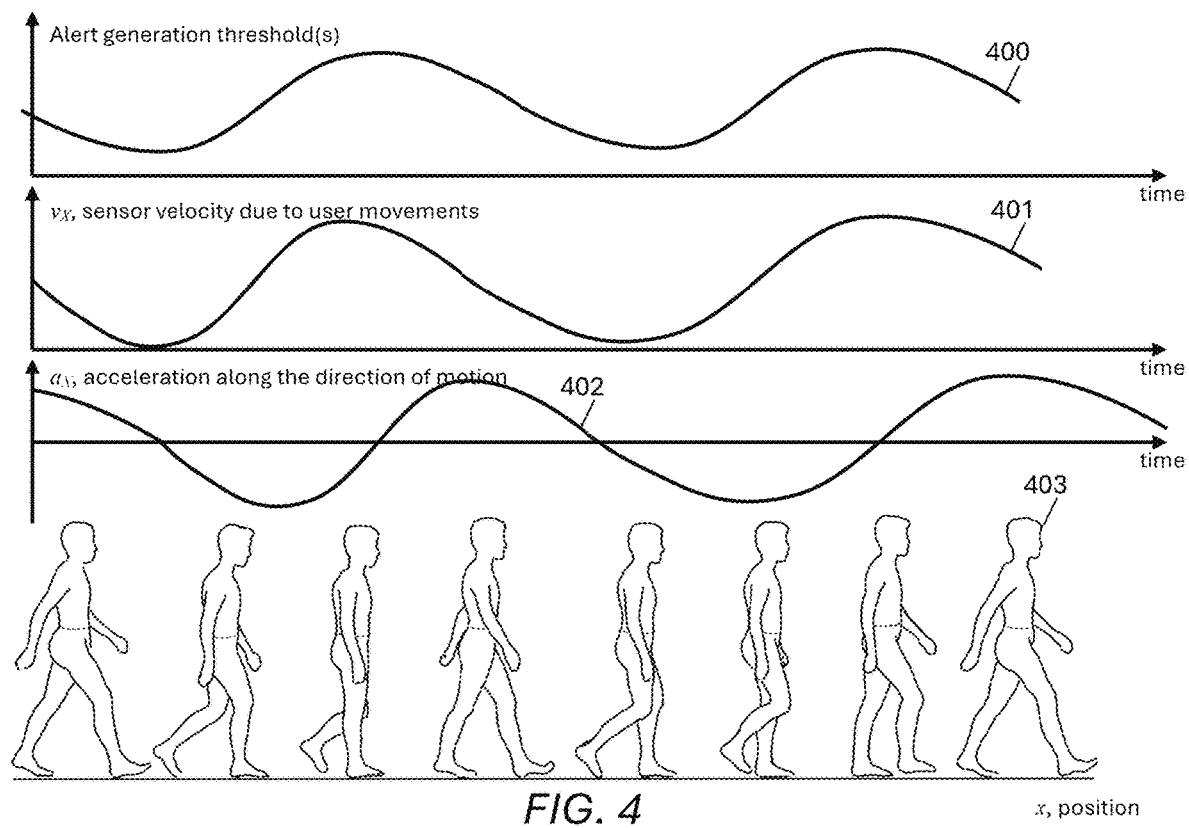
FIG. 4 shows a visualization of alert generation thresholds produced by active thresholding, the pedestrian velocity along the axis of motion, and the pedestrian acceleration along the axis of motion, with respect to the phase of the user's gait.

One parameter of a wearable approaching object detection system is the probability of false positives, namely the chance of issuing a false alarm when there is no approaching object (such as a car), while the sensor can experience mechanical movements, shaking, vibration, and/or rotation due to movements of the user. As illustrated in FIG. 4, the sensor's instantaneous velocity 401 and instantaneous acceleration 402 vary in a quasi-periodic way during one cycle of the gait 403 (a step taken by each foot). In order to minimize the probability of false alarm due to the movements of the system being interpreted as approaching objects, processing unit 107 determines the nature of the gait (or modality of the gait), such as strolling, walking, jogging, and running, by evaluating the statistical properties of outputs of an inertial measurement unit 109 over a period of multiple steps and adaptively adjusts its detection parameters based on the determined nature of the gait for the duration of multiple steps.

In many embodiments, in order to maximize the detection range and minimize the probability of a false alarm, the processing unit 109 can adjust its parameters of detection 400 dynamically during different phases of a single gait cycle 403 (two steps taken, one by each foot) to account for different rates of movement of the sensor during different phases (or segments) of a single gait cycle.

Figure 5:
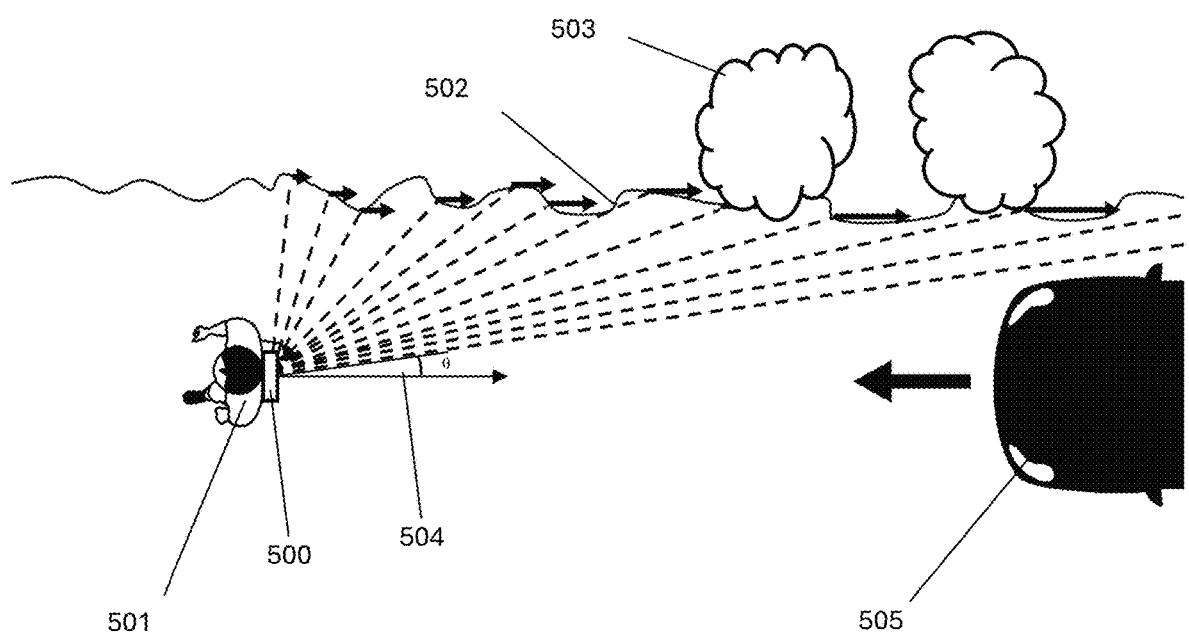
FIG. 5 shows the sensor configuration in some embodiments, and its resultant Doppler shifts induced by the environment in the sensor's frame of reference.

As illustrated in FIG. 5, in many embodiments, the approaching object detection system 500 is worn on the back of a pedestrian 501, while the pedestrian stays stationary or moves forward with different natures of the gait, such as stroll, walk, jog, or run. Due to the road 502 and surrounding objects 503, microwaves are reflected by objects that are not directly facing the module and instead have an angle θ (504) to the module 100 and hence present different Doppler shifts. This results in Fourier components at all speeds below the pedestrian's speed due to the cos θ reflected component.

In the approaching object detection system's frame of reference, receding objects have negative Doppler shifts (in other words, a red shift). An approaching object/vehicle 505 will have a positive Doppler shift (in other words, a blue shift), as illustrated in FIG. 5. In some embodiments, a single-phase mixing will observe the same low-frequency Doppler component for both approaching and receding objects and, therefore, to differentiate between approaching and receding objects, the processing unit 107 can determine the rate of change of the magnitude of the reflection or a change in the measured distance. In some embodiments, a plurality of mixers 105 driven synchronously with multiple phases 116 of the local continuous RF source can be utilized to obtain additional information about various objects, such as differentiation between receding and approaching objects. In some embodiments, a pair of mixers driven by two outputs of the local continuous RF source, which are substantially 90 degrees apart, namely, in-phase and quadrature-phase signals, generate two low-frequency outputs 301 and 302 corresponding to the in-phase (I) and quadrature (Q) Doppler of the reflected signal.

Figure 6:
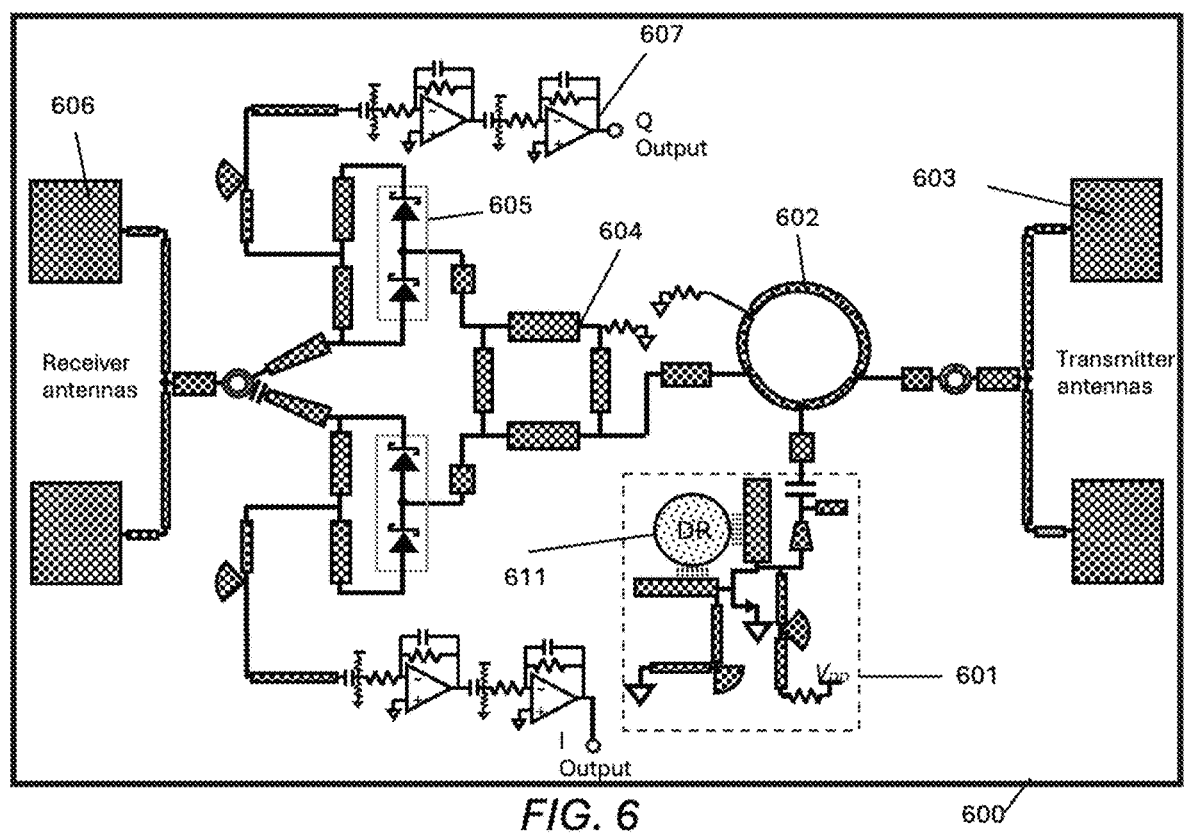
FIG. 6 shows a schematic of a microwave radar circuit design in one or more embodiments wherein the microwave designs use microstrip for the branch-line coupler, rat-race coupler, tapers, and multiple transmission lines in one or more embodiments.

In some embodiments of the invention, an RF unit can be implemented on a printed circuit board as microstrip components. FIG. 6 illustrates the block diagram of the RF unit 600 of such an embodiment. A dielectric resonator oscillator (DRO) 601 with parallel feedback where the dielectric resonator puck 611 that sets the frequency serves as a local continuous RF source. The RF source's output drives a rat-race coupler 602 configured to operate as a 50-50 splitter used to provide power to an RF transmitter that drives a pair of antennas 603 through a pair of transmission lines in synchronization with the DRO local continuous RF source 601. The antenna pair have a narrow vertical beam pattern, suitable for detection of vehicles on the surface road. The rat-race hybrid 50-50 splitter 602 also isolates the transmitter and receiver antennas to avoid interference. The other output of the 50-50 splitter 602 provides power to a branch-line 90-degree coupler 604 that generates two outputs synchronized with the DRO local continuous RF source 601, one with a 90-degree phase shift with respect to the other one. These two outputs drive two balanced mixers, each using two Schottky diodes in opposite directions 605. An RF receiver with a second pair of combined patch antennas 606 receives the reflected signal that contains information about the surrounding environment. The received reflected signal is split into two paths and taken to the two Schottky-diode-based 605 balanced mixers that generate two low-frequency outputs. Using low-pass filters on outputs of each mixer that contain Doppler signals, these low-frequency I and Q signals are taken to low-pass amplifiers 607 comprising two pairs of back-to-back on-board operational amplifiers in inverting configuration. The amplified baseband I and Q signals are sent to a second board that includes (but is not limited to) an analog-to-digital converter, a processing unit, and an inertial measurement unit amount.

Figure 7:
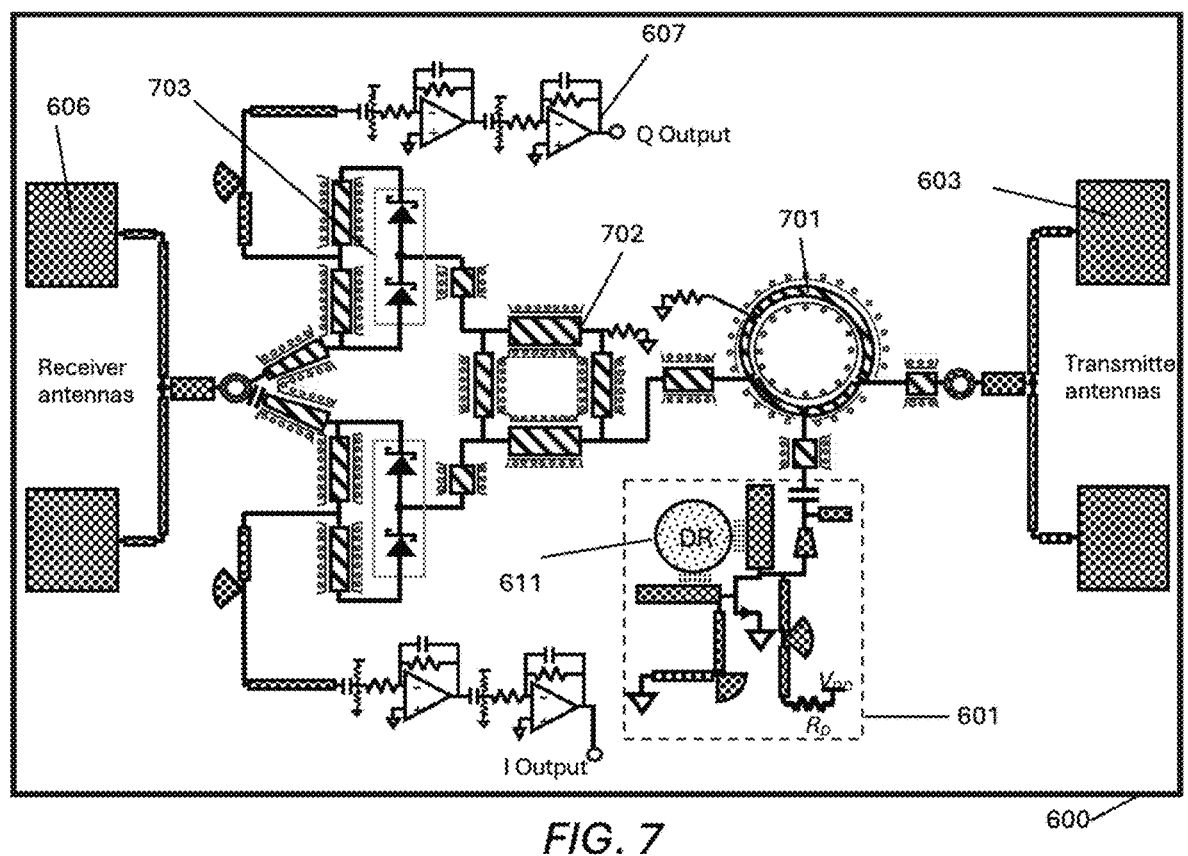
FIG. 7 shows a schematic of another example embodiment using co-planar waveguide with ground back for the branch-line coupler, rat-race coupler, tapers, and multiple transmission lines in one or more embodiments.

In some embodiments, a number of microwave components/elements of the RF unit can be implemented using a co-planar waveguide with or without ground plane to reduce the losses in the substrate, as illustrated in the RF unit of the exemplary embodiment illustrated in FIG. 7. In this exemplary embodiment, several elements of the RF unit, such as the rat-race 50-50 coupler 701, 90-degree branch-line coupler 702, and the mixers 703 are implemented using co-planar waveguides with a ground backplane. In some embodiments, the lower loss associated with the use of any combination of alternative transmission line designs, such as co-planar waveguide with or without ground, microstrip, or striplines, enables use of low-cost substrate materials with higher dielectric loss, such as low-cost two-layer PCB with a fiberglass-reinforced epoxy (FR4).

Figure 8:
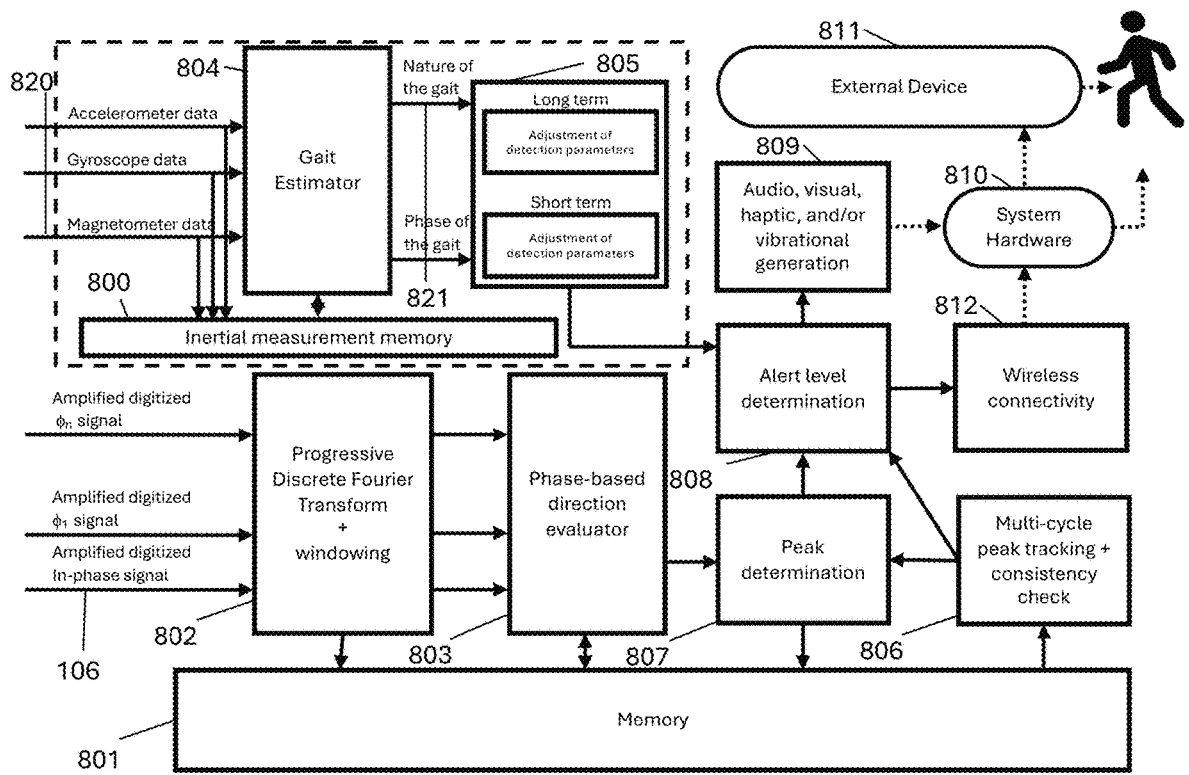
FIG. 8 shows a block diagram illustrating an example signal processing using memory to determine alert levels by adjusting both the long-term and short-term detection parameters based on the gait estimation.

In some embodiments of the invention, the digitized and amplified signals of different phases 106 undergo a signal processing and combine with the gait estimation and adjustment of detection parameters in a central decision-making algorithm, as illustrated in FIG. 8. In some embodiments, the gait estimation uses past as well as present IMU readout data 820, gait estimation 821, and detection parameters stored in an IMU memory 800. In many embodiments, the signal processing steps for alert generation use a memory 801 that contains past data from many or all of the processes, as illustrated in FIG. 8. In many embodiments, the inputs of different phases 106 are multiplied by a window and a Progressive Discrete Fourier Transform 802 is performed to decompose the signal into its component frequencies. In some embodiments, the different phases 106 are used to determine the direction by the phased-based direction evaluator 803 at a specific frequency bin. In an embodiment using in-phase and quadrature inputs a cross-product analysis (901 and 903 in FIG. 9) can quickly determine the polarity of the signal. In this exemplary embodiment, past gait estimation data, peaks, DFTs, peak frequency bins, and raw data are stored in the memory and used in the alert level determination as well as at a frequency bin, acting as a direction estimator 803. In many embodiments, the input from the IMU 820, contains at least one of an accelerometer, a magnetometer, or a gyroscope, is analyzed by a gait estimator 804 to determine the phase and the nature of the gait. In some exemplary embodiments of the invention, the nature of the gait determines long-term decision-making parameters while the phase of the gait determines the short-term decision-making parameters 805, accounting for present and past IMU data.

In some embodiments, a multi-cycle peak tracking algorithm 806 determines the consistency of signals. By keeping track of past peaks, their magnitudes, and their frequencies using memory 801, the one or more of the past frequencies and magnitudes could be compared to the current frequency and magnitudes. In an exemplary embodiment, a change in frequency, Δf, and a change in magnitude, ΔMAG, can be defined for the frequency domain matrix of the discrete Fourier transform. If they are within the range (Δ) of a past peak, then the peak will remain active for the peak determination 807. Using a multi-cycle peaking tracking algorithm can avoid false positives that are caused by signals at different frequencies as well as peaks caused by noise within the matrix of the discrete Fourier transform. The peak detection algorithm 807 determines peaks (i.e., places where the sign of the derivative changes), as the peak caused by an incoming object is more likely to give the most accurate information regarding the object. In an exemplary embodiment, the peak determination algorithm 807 uses information from the discrete Fourier transform matrix, the ROT matrix, the memory 801, and the multi-cycle peak tracking 806. In an exemplary embodiment, the gait estimation and adjustment of detection parameters combine with the peak detection algorithm to determine the alert level 808 in a central decision-making algorithm. In this exemplary embodiment, past gait estimation data, peaks, DFTs, peak frequency bins, and raw data are stored in the memory 801 and used in the alert level determination 808 as well as gait estimation 804.

In many embodiments, the alert level can use any combination of audio, visual, haptic, or vibrational generation 809 to alert the user through the system hardware 810 or an external device 811. In embodiments using wireless connectivity 812, the alert level can be communicated to an external device 811 through a software application running on the external device 811. In some embodiments, the software application can display the alert level generated. In many embodiments, the audio, visual, haptic, or vibrational generation 809 can change with respect to the alert level, giving the user a better sense of the danger.

In some embodiments, a discrete Fourier transform is performed on the digitized low-frequency signals. In some embodiments this can be done by executing the Fast Fourier Transform (FFT) 202 algorithm on the processing unit, as illustrated in FIG. 2. The FFT can be executed only once the sampling and digitization of an entire set of analog signals has been completed, as illustrated in FIG. 2. In some embodiments, the processing unit can progressively execute calculations of the DFT 205 during the idle time between samples to avoid delay and deadtime, as illustrated in FIG. 2. This progressive discrete Fourier transform (PDFT) method can significantly lower the deadtime and reduce computational and memory overhead, and/or long gaps between the sampling intervals when no measurement can be performed. The PDFT algorithm uses the idle time between samples to accumulate the value and have the final DFT results ready at the end of each measurement window, as seen in FIG. 2. This is possible by noting different terms of the DFT computation given by:

$$X[k] = \sum_{n=0}^{N-1} x[n] e^{-j2\pi k \frac{n}{N}}$$

which can be computed only from 0 to N/2−1, because the first half is needed due to symmetry. The real and imaginary elements of each of the digitized components, such as I or Q, can be accumulated progressively as additional samples become available during the sampling phase and computed in the following manner:

$I_{re}[k] \leftarrow I_{re}[k] + i[n] \cdot \cos(2\pi kn/N) \cdot w[n]$ $I_{im}[k] \leftarrow I_{im}[k] - i[n] \sin(2\pi kn/N) \cdot w[n]$ $Q_{re}[k] \leftarrow Q_{re}[k] + q[n] \cos(2\pi kn/N) \cdot w[n]$ $Q_{im}[k] \leftarrow Q_{im}[k] - q[n] \sin(2\pi kn/N) \cdot w[n]$ where the i[n] and q[n] are the nth time-domain samples of the digitized in-phase and quadrature low-frequency outputs, and w[n] is the nth sample of the window function which could be any of the possible windows including, but not limited to, a rectangular window, a triangular window, a Blackman window, a Gaussian window, a sine window, et cetera. By the completion of a batch of data sampling, the results of the progressive discrete Fourier transform would be also ready. This minimizes the sensor dead time and time lag between the reception of the reflection signal and the detection of the relevant frequency components.

The progressive discrete Fourier transform computation can be optimized for wearable devices by providing different modes, such as a table-based method for faster computation where the sine and cosine coefficients are pre-calculated and stored in memory with increased memory usage and a calculation-based method that reduces memory requirements but is more demanding computationally since the sine and cosine coefficients are recalculated every cycle. The flexibility to choose between these methods allows the system to balance performance and resource constraints, depending on the application scenario and mode of operation in different embodiments of the invention.

In some embodiments, using multiple mixers 105 with different phases 116 enables accurate differentiation between an approaching object and a departing object, and further provides additional quantitative measures of the significance of the approaching object. In an embodiment where two synchronously driven outputs of the local continuous RF source with an approximate 90-degree phase shift are used, the received signal is split into two paths with an approximate 90-degree phase shift before mixing; the in-phase and quadrature-phase low-frequency outputs can be digitized and processed by the processing unit.

Figure 9:
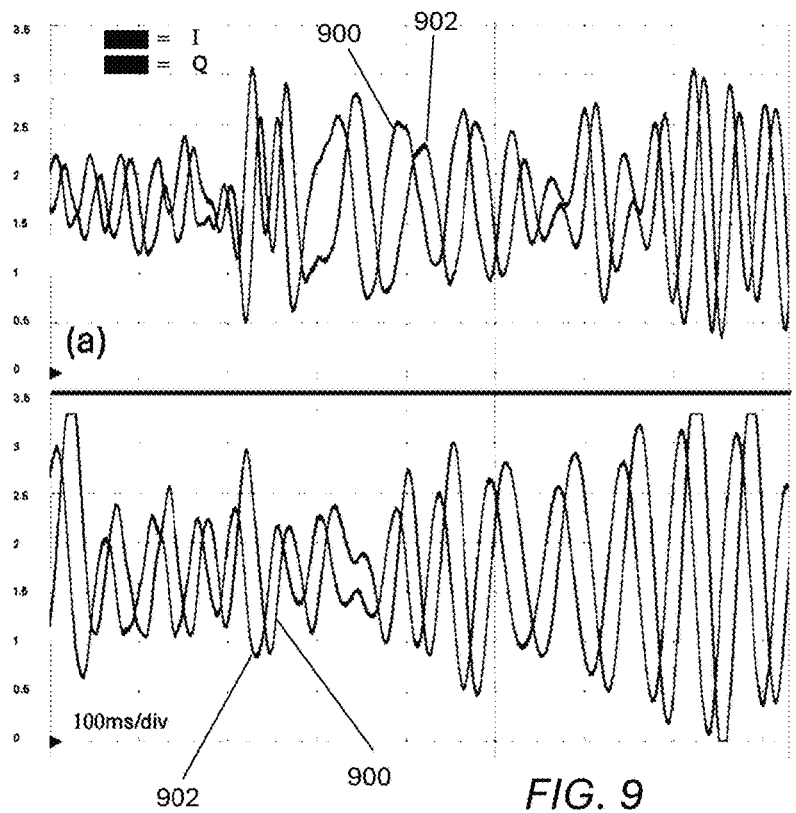
FIG. 9 shows a vector visualization of the cross-product calculation to determine the polarity of the object side-by-side with examples of unprocessed signals outputted by the RF unit.
Figure 9:
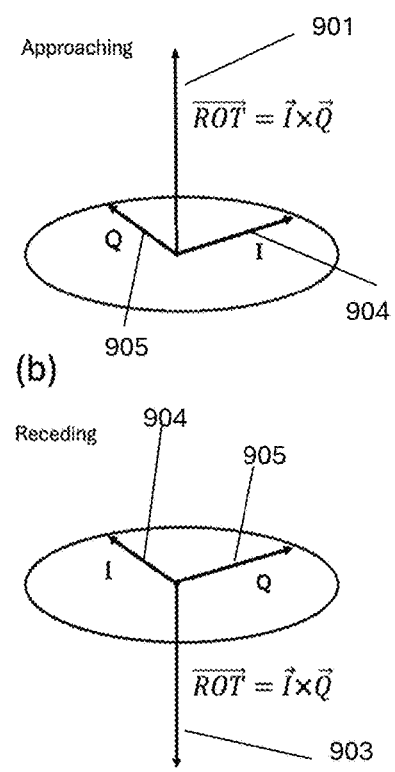

In embodiments where a discrete Fourier transform is computed, using any of the possible methods (including, but not limited to, PDFT). As illustrated in FIG. 9, the real 900 and imaginary 902 components of each frequency bin within the discrete Fourier transform can be expressed as vectors I 904 and Q 905 in the xy plane. In embodiments with a 90-degree phase shift, the level of closeness to 90 degrees between the low-frequency in-phase and quadrature-phase vector outputs, and the polarity (positive or negative) of each Doppler component at each frequency can be evaluated to determine the quality of the signal at each frequency component and to separate the red and blue shifts. A high-quality signal would have in-phase 900 and quadrature 902 phase components that are close to 90 degrees. A vector cross product can be used as an effective way to capture the magnitude and the orthogonality, and its sign determines the direction of the polarity of the shift and hence the direction of relative motion, namely, approaching or receding.

As shown in FIG. 9, depending on whether the object is approaching or receding, the in-phase 900 and the quadrature 902 phase output will be 90 degrees ahead of or behind (as shown in 902 and 903) each other. In some embodiments, the in-phase (I) 900 and quadrature (Q) 902 outputs can be processed as vectors $\vec{I}$ 904 and $\vec{Q}$ 905 on a circle with the angular frequency ω and angle θ, (901 and 903). The direction of motion associated with each frequency component, a cross product of the 2-dimensional complex vectors associated with each frequency component of the low-frequency in-phase or the quadrature signals from the board can be determined from the polarity of the cross product 901 showing the direction and its magnitude capturing the strength. As illustrated in FIG. 9, a positive Doppler shift has the I signal 90 degrees ahead of the Q with a cross product 901 being positive and vice versa when the shift is negative 903. The cross product can be computed as:

$$\vec{ROT} = \vec{I} X \vec{Q} = \det\begin{vmatrix} \hat{i} & \hat{j} & \hat{k} \\ I_x & I_y & I_z \\ Q_x & Q_y & Q_z \end{vmatrix} = \det\begin{vmatrix} I_x & I_y \\ Q_x & Q_y \end{vmatrix} \hat{k} = (I_x Q_y - I_y Q_x) \hat{k}$$

Computing the cross product of the in-phase and quadrature frequency components, referred to herein as ROT, not only reveals the polarity of the Doppler shift emerging through the sign of the ROT, but also provides a measure of the strength of the magnitude given by the individual size of the in-phase and quadrature, as well as their relative angle. By computing the polarity and magnitude of ROT 901 and 903, the polarity and magnitude of the angle between the two vectors can be estimated. A cross product of the two vectors provides a measure of the quality of signal and validity of the detection. For example, in certain embodiments, a low-quality signal with an exemplary 10-degree phase shift caused by noise could be given lower weight. The cross product can decrease the magnitude of the ROT for such "low-quality" frequency components to the point where it doesn't trigger alerts in the decision-making algorithm. However, if the signal is close to 90 degrees apart the large magnitude of that frequency component is maintained and the polarity is found, revealing whether the object is approaching or receding and whether issuing an alarm is warranted. The sign of ROT indicates the direction of relative motion (approaching vs. departing) and its magnitude shows the level of certainty and the strength of the signal for a certain frequency component. In some embodiments, this quantity is calculated on each one of the Fourier transfer transform bins and allows the system to identify an approaching vehicle with a weak signal in the middle of a large number of receding reflections when the user is moving forward.

In some embodiments, the magnitude of different frequency components of the Fourier transform can be used to determine the direction of motion. Different objects can also be detected by evaluating their frequency (and hence relative velocity) and the rate and polarity of the change of their associated Doppler component. For example, if certain frequency bin's magnitude is increasing with time, the system can decide that the object is approaching, because the reflected signal becomes stronger as an object becomes closer and a larger fraction of the electromagnetic wave is reflected. Since all objects, except an approaching vehicle, are moving relatively away from the detection system, there will be a frequency content at every frequency up to the one associated with the user's speed. This is because the sensor is not perfectly directional and can detect objects to its left and right. As the angle between the objects on the side of the road and the device increases, the cosine of that angle and the relative radial velocity decreases. This means that when the user is traveling at a velocity of v (in meters per second), every frequency lower than that which corresponds to v will also have a detectable signal in the Fourier spectrum. A regression analysis can be performed on the magnitudes of each frequency component to determine the sign of its slope with time, in other words, if the magnitude is getting larger or smaller. Additional information can enhance the regression analysis to better differentiate which frequencies correspond to the real objects of concern and not caused by movement in that respective reference frame.

Some embodiments may be used under user's different natures of the gait (or modalities of gait), such as standing, strolling, walking, jogging, or running, wherein additional Doppler signal induced by the movement of the sensor can vary under different natures of the gait. If fixed thresholds (of amplitude and frequency of occurrence) are used for all cases, they need to be set high enough to avoid false positives for the worst movement phase of cases with the largest movement and vibrations, for example running. A fixed threshold may result in a significant loss of sensitivity and detection range resulting in little reaction time for the pedestrian.

An inertial measurement unit comprising any combination of accelerometers, gyroscopes, or magnetometers, can detect a user's movements and determine their magnitude and nature of the gait. This can be done in some embodiments by adaptively changing the thresholds as an increasing function of the standard deviation of the acceleration under different natures of the gait. This solution requires the thresholds to be high enough to avoid false triggers during the most violent parts of taking steps (the worst phase of the gait), but it allows for a higher detection range when standing or walking.

Figure 10:
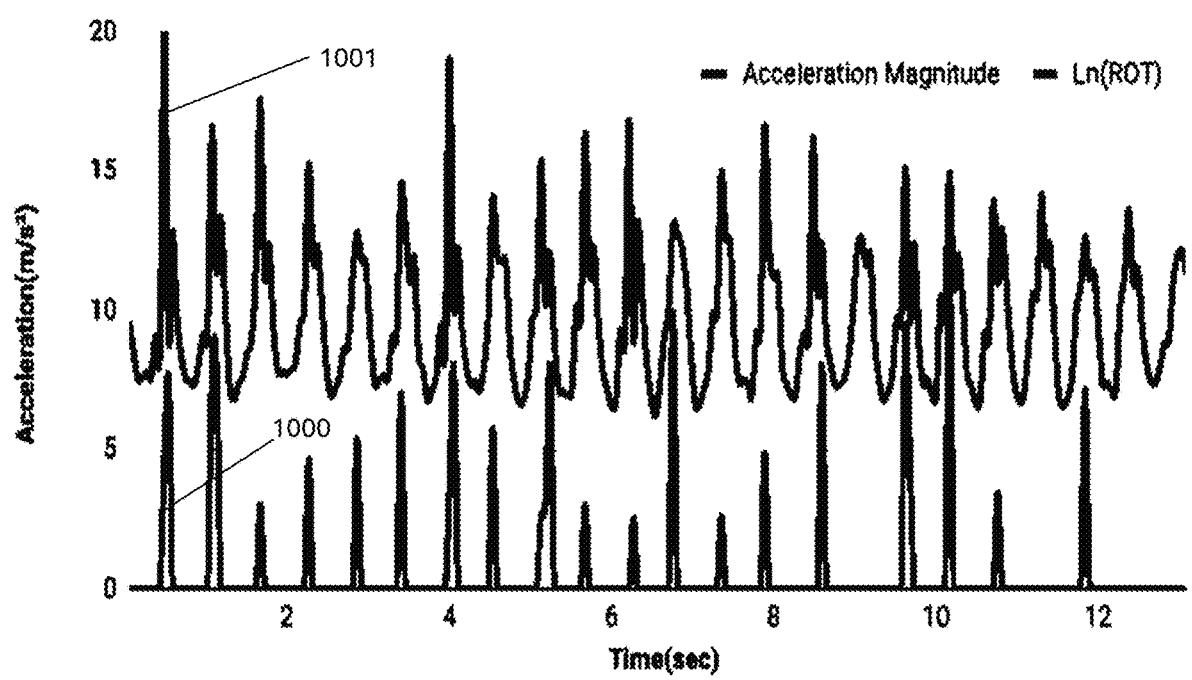
FIG. 10 shows a plot of the user's total acceleration and the natural log of the magnitude of the highest peak of the ROT matrix against time in an embodiment where the user is walking.

In some embodiments, the phase of the gait can be determined by the processing unit using information obtained from other sensors, such as the inertial measurement unit. The determined phase may be used dynamically to adjust the detection parameters during different phases of the gait. An example of acceleration and decision-making detection profile is shown in FIG. 4 for one full gait cycle. FIG. 10 shows the measured ROT 1000 and acceleration 1001 in an exemplary embodiment in the absence of a moving vehicle; it is readily seen that the measured values of the ROT in the absence of an approaching vehicle increases with acceleration during the gait cycle, due to the movements of the detection system itself.

Figure 11:
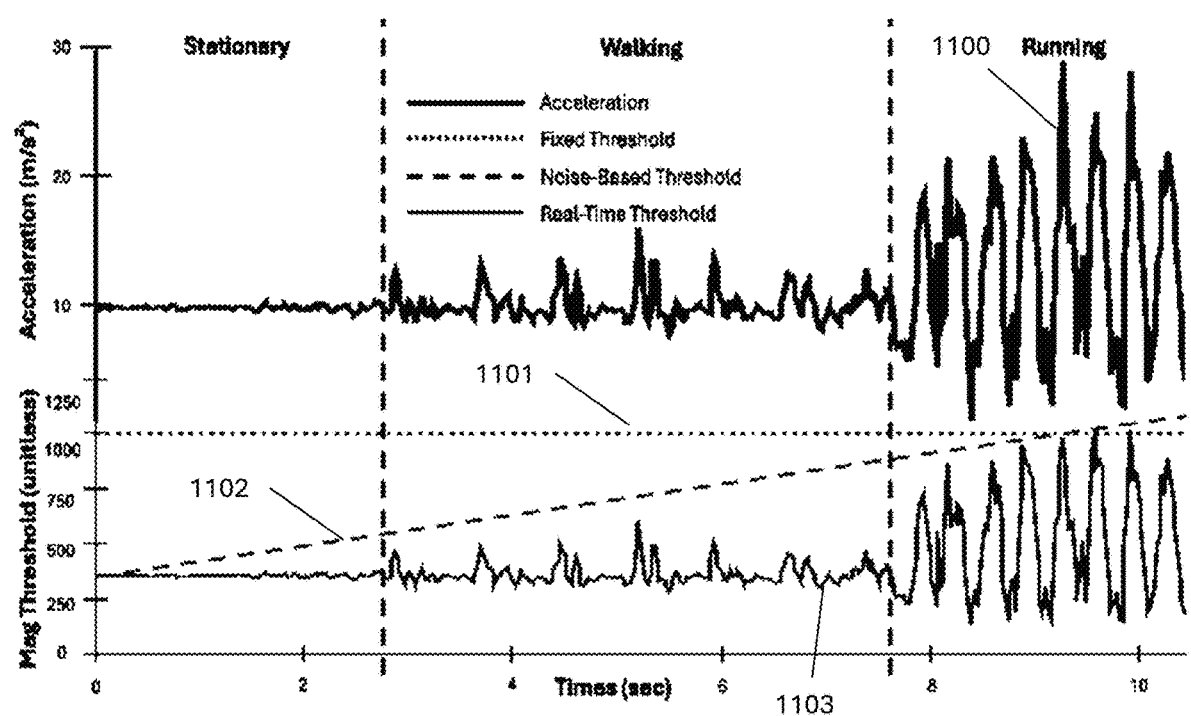
FIG. 11 shows a plot of the user's total acceleration, a constant threshold, a noise-based threshold, and the real time threshold against time in an embodiment where the user begins stationary, then walks, then runs.

In some embodiments, the acceleration data can be stored and used by a processing unit to calculate the standard deviation of an array of lengths n containing the past n samples of the accelerometer's data. As seen in FIG. 11, in an exemplary embodiment of the invention, the measured accelerometer data 1100 indicates that the gait cycle period when walking is in the 1-2 Hz range for walkers, and around 3-4 Hz for runners. A MEMS accelerometer can sample at rates higher than 20 Hz and hence can easily capture the range of acceleration during a full gait cycle. The magnitude of the total acceleration vector for a person who begins standing still, then walks, and then runs is shown in FIG. 11. A fixed threshold 1101 would need to be set up high enough to avoid user-movement-induced alerts. An adaptive threshold adjustment 1102 would increase or decrease the detection thresholds based on the detected nature of the gait, while a dynamical threshold adjustment 1103 adjusts the threshold in the read time at each phase of the gait based on the in inputs from the inertial measurement unit components such as the accelerometer.

Dynamically monitoring the acceleration profile during each cycle of steps and lowering the detection thresholds in real time during the quieter (i.e., less active) phases of the gait cycle, while raising it during the more active parts of the gait cycle to avoid false positives due to movements, as illustrated in FIG. 11 can achieve higher sensitivity and range.

The dynamic acceleration-based detection parameter adjustment is similar to the adaptive thresholds, however, it applies the threshold control at such moments where the threshold needs to be raised, as opposed to raising the threshold floor, which is what the adaptive thresholds do. The difference can be seen in FIG. 11.

With dynamic acceleration adjustment, the detection range for a stationary user, a walking user, and a running user would be comparable. By dynamically adjusting the thresholds in relation to the magnitude of acceleration, the range is decreased during a period in which a step is taken. The approaching object detection system would still not generate any false alarms as during the time where there is no acceleration and noise caused by a step, the detection system inputs are similar to that of a stationary user. This can be done by changing the thresholds as an increasing function of the standard deviation of the acceleration. In such embodiments, the thresholds should be relatively high enough to avoid false triggers during the most active parts of taking steps (the phase of the gait) with the highest movement of the user and the sensor, but it allows for a higher detection range when standing or walking. The relative phase of the movement and shaking-induced increase in ROT may be different from that of the acceleration components. In some embodiments, a second relatively slow Fourier transform computation may be used to find the relative phase of the two periodic signals and uses it in an adjusting of a threshold.

Information about the phase of the gait may be used to improve the detection accuracy. As seen in FIG. 10, in an exemplary embodiment, when the ROT 1000 is calculated based on the measurements of the unit 100 in the absence of a moving car, it can be seen that ROT increases around the same time during the gait cycle when the measured acceleration 1001 is also increasing. Dynamically monitoring the acceleration profile 1001 during different phases of the gait within each cycle of steps and lowering the detection thresholds in real time during the quieter phases of the cycle achieves higher sensitivity and range, while dynamically raising it during the more active parts of the gait to avoid false positives due to movements, as seen in FIG. 10. In some embodiments of the invention, it may be beneficial to dynamically set the instantaneous detection threshold parameters as a monotonic function of a weighted sum of different components of the accelerometer, gyroscope, and/or magnetometer readouts.

In many embodiments of the invention, to address the challenges posed by user-induced motion, such as walking, jogging, or running, the software dynamically adjusts detection thresholds in real time, where the inertial measurement unit provides continuous data (i.e., regular time intervals) on the user's motion state, including acceleration, rotation, and gait parameters, such as the phase of the gait. The processing unit analyzes this data to adaptively modify the detection parameters, such as sensitivity, noise filters, and Doppler shift thresholds. For example, during the high-vibration phase of a gait cycle, thresholds are temporarily raised to reduce false positives, while during the quieter phase, thresholds are lowered to maximize sensitivity.

In some embodiments of the invention, the software implementation includes algorithms to predict the user's next motion phase based on historical inertial measurement unit data stored in memory 800. Gait estimator algorithm 807 anticipates changes in movement, the alert level determination, 806 proactively and dynamically adjusts detection parameters based on the short and long-term adjusted parameters 808, thereby ensuring seamless operation in dynamic environments. These adaptive mechanisms enhance the system's performance and user experience by maintaining high detection accuracy without compromising battery life or computational efficiency.

The software identifies peaks in the frequency spectrum to detect objects of interest. A peak detection algorithm extracts the most prominent frequency components, filtering out minor fluctuations and low-intensity signals. To enhance detection reliability, a tracking mechanism monitors peak frequencies across multiple Fourier transform cycles, confirming the presence of consistent signals before triggering an alert. This approach ensures that transient noise or spurious signals do not trigger false alerts, so as to maintain system accuracy.

In some embodiments, the algorithm prioritizes real time operation by optimizing computational efficiency. Functions such as sine and cosine table generation and logarithmic calculations are precomputed or highly optimized to minimize processing delays. Sampling intervals and discrete Fourier transform calculations are carefully managed to ensure timely detection, even under high-frequency conditions. This real time performance is critical for wearable applications, where immediate feedback can significantly enhance user safety.

In some embodiments, the software implements a tapered thresholding mechanism to improve detection accuracy by dynamically adjusting sensitivity across the frequency spectrum. This feature ensures that lower-frequency noise and irrelevant reflections, such as background clutter, very slowly moving objects or stationary objects, are effectively suppressed. The threshold is progressively increased for lower frequencies where environmental and user-induced noise are more prevalent while maintaining high sensitivity at higher frequencies to detect fast-approaching vehicles. This adaptive approach enhances the reliability of object detection in urban environments and dynamic settings.

In many embodiments of the invention, upon detecting an object that meets predefined criteria, the software activates alert mechanisms, including audio signals and visual indicators. The audio alert generates a tone with a frequency proportional to the detected object's proximity or speed, while visual alerts use LEDs to provide directional warnings. These alerts are dynamically adjusted based on the detection results, ensuring that users receive timely and context-appropriate warnings.

In certain embodiments, machine learning algorithms, including neural networks, are employed to enhance the decision-making accuracy of the wearable approaching object detection system. These algorithms can analyze patterns in the digitized low-frequency outputs from the RF unit, along with motion data from the inertial measurement unit, to differentiate between approaching vehicles and other stationary or moving objects in the environment. By training the neural network on a large dataset that includes various use cases (e.g., different pedestrian gaits, environmental conditions, and vehicle speeds), the system can achieve higher detection reliability and reduce false positives and negatives.

The neural network architecture may include convolutional layers to extract features from time-series data, recurrent layers to capture temporal dependencies, and fully connected layers to classify objects based on their Doppler signatures and motion patterns. Inputs to the neural network can include processed Fourier transform data, cross-product calculations of in-phase and quadrature components, time-domain low-frequency outputs, and gait-specific parameters derived from the inertial measurement unit. The output of the neural network determines whether an alert should be triggered, providing real time feedback to the user.

To further enhance performance, the neural network can be configured to operate in conjunction with an adaptive learning algorithm. This allows the system to update its detection parameters dynamically based on real time feedback and newly encountered scenarios. For instance, the network may adjust its sensitivity thresholds and other detection parameters in response to changes in the user's gait or environmental noise, optimizing detection performance without requiring manual recalibration. Additionally, pre-trained models can be fine-tuned through transfer learning to accommodate specific user profiles, ensuring personalized and accurate detection.

While in many embodiments, these machine learning-driven functionalities are implemented on the low-power hardware the processing unit on the system maintaining user privacy and reducing latency and function autonomously (edge computing), in certain other embodiments the neural network can be executed on a remote processing unit on the cloud via wireless connectivity, which can efficiently handle both the computational load and the system's power constraints.

Embodiments of the present disclosure are adapted to maximize the range while avoiding false alarms when the user is not a pedestrian. For example, if the user is a skateboarder and, for example, hits a rock or a bump on the road, the thresholds associated with embodiments of the present disclosure will be quickly adjusted for the larger acceleration, but then return to a normal level after the noisy signal has passed. In another embodiment where the user is a skier, if they are in a higher noise profile, the thresholds will increase, but as soon as their acceleration and therefore signal, changes, the thresholds actively adjust to ensure they are at an optimal level.

In certain embodiments, the RF transmitter operates in a pulsed radar mode, where short bursts of radio frequency signals are transmitted at regular intervals, followed by listening periods during which the RF receiver captures reflected signals. This pulsed operation allows the system to determine the distance and relative speed of approaching objects by analyzing the time delay and Doppler shift of the reflected pulses. Pulsed radar offers improved range resolution and the ability to detect objects in cluttered environments, making it highly effective for pedestrian safety applications.

The pulsed radar mode also enhances power efficiency, as the transmitter remains active only during pulse emission, reducing overall power consumption. The pulse repetition frequency (PRF) can be dynamically adjusted based on the user's motion state, as detected by the inertial measurement unit, and the gait parameters as evaluated by the processing unit. For example, a higher PRF may be used during rapid activities, like running, to ensure timely detection of fast-approaching vehicles, while a lower PRF can be employed during stationary or slower movements to conserve energy. The system processes the reflected pulses in real time, using advanced signal processing techniques to extract precise information about the distance, speed, and trajectory of the detected objects, thereby providing timely and accurate alerts to the user.

In certain embodiments of the invention, the RF unit can transmit a continuous signal whose frequency is linearly modulated over time. The reflected signal is then mixed with the transmitted signal, resulting in low-frequency output proportional to the time delay, and hence the distance to the reflecting object. By analyzing the low-frequency output, the processing unit can determine both the range and relative velocity of objects in the detection zone. To further improve detection accuracy and reduce false alarms, the information from the low-frequency outputs is combined with real time motion data from the inertial measurement unit, which can include accelerometers, gyroscopes, and magnetometers. The accelerometer data allows the system to account for user-induced vibrations and motion artifacts, which could otherwise be misinterpreted as valid radar reflections. For example, during walking or running, the inertial measurement unit detects periodic accelerations caused by the user's gait, enabling the system to dynamically filter out Doppler shifts associated with these movements, which ensures that only reflections from true approaching objects, such as vehicles, are detected and processed. The inertial measurement unit data complements these methods by providing context about the user's motion state, allowing the system to adaptively adjust detection thresholds and processing algorithms.

The above-mentioned synergistic approaches minimize false positives caused by user motion and enhances the system's ability to detect and alert the user to potential hazards in real time.

Measurements of Certain Embodiments of the Invention

Figure 12:
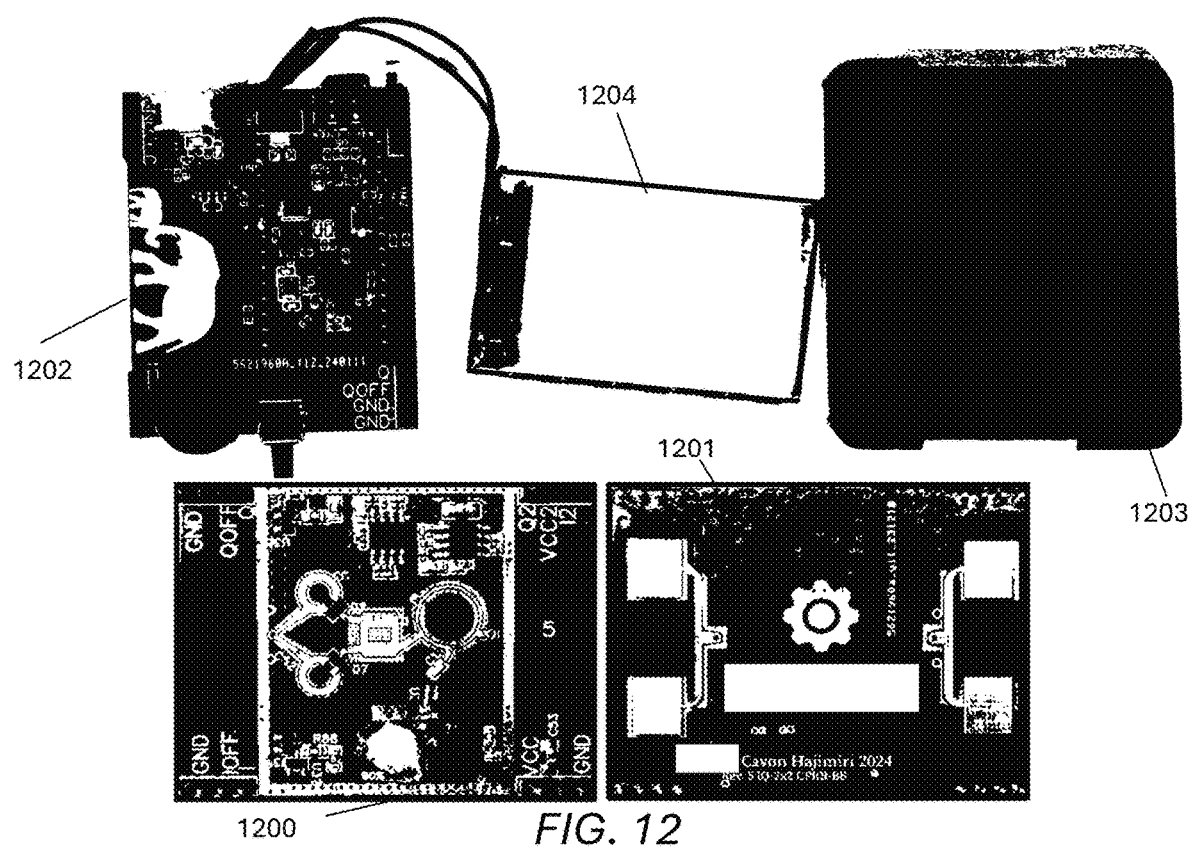
FIG. 12 shows a custom PCB for the high-frequency board, processing PCB, battery, and shell of an exemplary embodiment.
Figure 13:
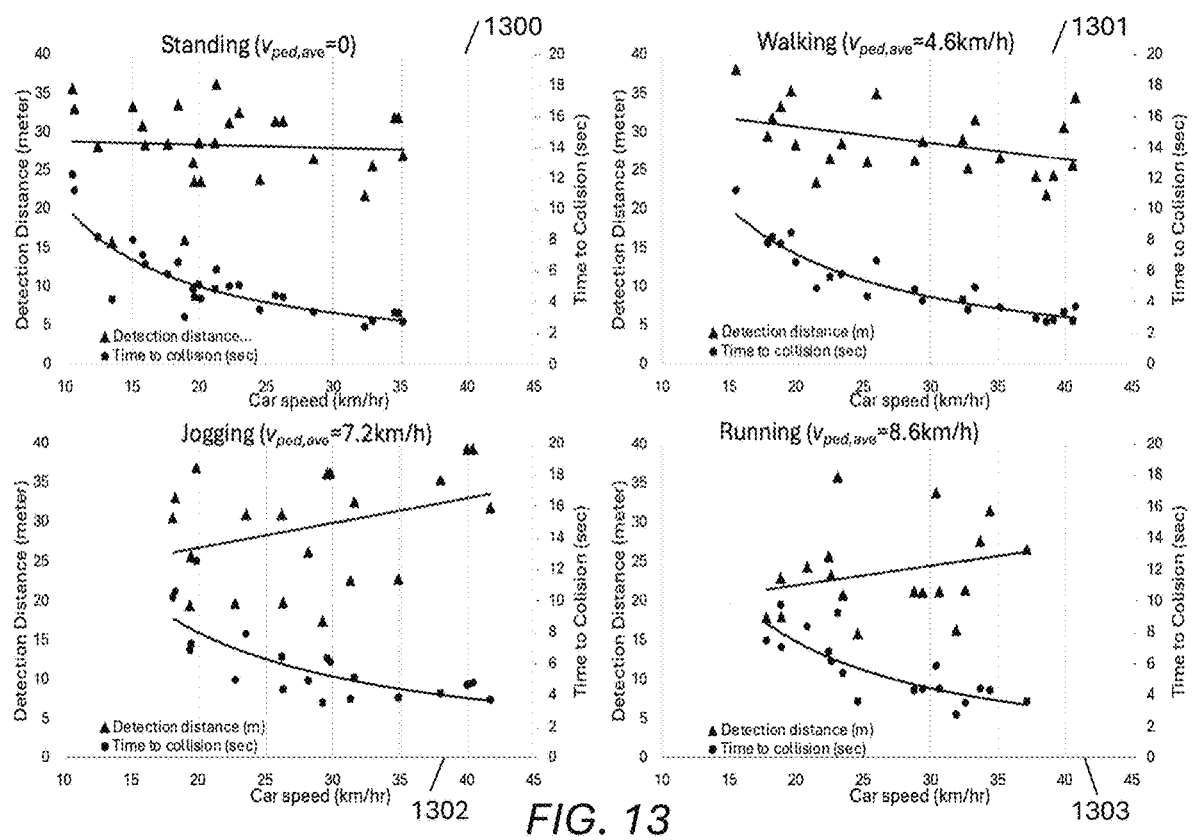
FIG. 13 shows plotted data collected from an approaching car where the system was a dual-phase, dynamically adjusting embodiment using multi-cycle peak tracking.

A wearable approaching object detection system similar to the system described above with respect to FIG. 7 can be implemented as shown in FIG. 12. A box incorporating elements, such as a printed circuit board (front 1200 and back 1201) incorporating the low-power RF unit 101 and other functions and a second printed circuit board 1202 comprising the processing unit, the inertial measurement unit, wireless connectivity, alarm generation, power management, etc., a box 1203, a battery 1204 was tested to measure typical detection distances and time-to-collisions for an exemplary embodiment of the invention. This exemplary embodiment operates at an RF frequency of approximately 10.5 GHZ, although the invention principles are applicable at a large range of frequencies, FIG. 13 shows the experimental results obtained from testing an object detection system, in accordance with embodiments of the present disclosure. To perform the test, the wearable approaching object detection system was strapped to a user's back to test during standing, walking, jogging, and running on a flat paved area. During the test, a car approaches the user from behind nearly 100 times at different speeds. Distance markings were placed every 2.5 meters, and each run was recorded on a camera, with the user signaling upon hearing the alarm buzzer. Through playback, the time, distance, and velocities were calculated. Test results obtained using this experimental configuration including scatter plots of the detection distance and the time between detection and potential collision with the vehicle are plotted against the vehicle's speed, for all four natures of the gait, namely standing 1300, walking 1301, jogging 1302, and running 1303, are shown in FIG. 13. In this example, using real time thresholding, for vehicle speeds of from 10-40 km/h, standing, walking, jogging, and running pedestrians resulted in an average of 27.1, 27.6, 28.2, and 22.6 meters of detection range, respectively, to provide adequate time to react. During walking, jogging, and/or running the system dynamically adjusts radar sensitivity based on the phase of the gait estimates, and/or based on the inertial measurement unit data, thus ensuring accurate detection of fast-approaching vehicles despite user-induced motion noise.

While specific approaching object detection processes and decision-making sequences are described above, any of a variety of approaching object detection processes that apply any combination of adjustable detection parameters adaptively and/or dynamically in a coordinated manner in response to internal and external inputs to achieve any combination of longer detection range, larger response time for the user, minimum false positive and false negative detections can be utilized as appropriate to the requirements of specific applications in accordance with various embodiments of the invention. Furthermore, while the detection processes described herein are discussed in the context of approaching vehicles toward pedestrians, similar processes can also be utilized in other applications, such as approaching motorcycles, bicycles, scooters, and other individuals on foot from behind, as well as skier and snowboarded using the detection system to receive alarms about other skiers and snowboarder approaching from behind to avoid accident. Also, skateboarders, rollerbladers, bicyclists, motorcyclists, and drivers can use this invention or certain aspects of it, wherever detection of an approaching object can be beneficial.

Although the present invention has been described in certain specific aspects, many additional modifications and variations would be apparent to those skilled in the art. It is therefore to be understood that the present invention may be practiced otherwise than specifically described, including various changes in the implementation other than those described herein such as (but not limited to) adaptive and dynamic detection parameter adjustment that perform that use information from various sensors, such as inertial measurement units, optical information, audio input, ultrasonic passive and active detection, without departing from the scope and spirit of the present invention. Thus, embodiments of the present invention should be considered in all respects as illustrative and not restrictive.

What is claimed is:

1. A wearable system adapted to detect an approaching object, comprising:
   a radio frequency (RF) unit comprising:
      a local continuous RF source generating an output;
      an RF transmitter comprising at least one antenna element driven in synchronization with the local continuous RF source;
      an RF receiver comprising:
         at least one RF receiving element comprising at least one antenna element receiving the reflected signal;
         a plurality of mixers driven synchronously by different phases of the local continuous RF source to generate a plurality of low-frequency output signals;
   an analog-to-digital converter configured to digitize the plurality of low frequency output signals to a plurality of digital data outputs at given time intervals;
   an inertial measurement unit configured to periodically measure inertial movements and vibration parameters of the wearable system;
   a processing unit configured to execute a decision-making algorithm by receiving the plurality of the digital data outputs and measurements of the inertial measurement unit to continuously adjust one or more detection threshold based on the measured user's motion state; and
   an alert system activated upon detection of an object exceeding one or more adaptive threshold, wherein the threshold is adjusted based on real time gait parameters.

2. The wearable system of claim 1, wherein the processing unit is further configured to compute progressive discrete Fourier transform on the plurality of digital data outputs to generate complex-valued arrays during an interval between the analog-to-digital converter samples.

3. The wearable system of claim 1, wherein the plurality of digitized low-frequency output signals are used by the processing unit to determine at least one of direction of relative motion, or speed, or size of the detected object.

4. The wearable system of claim 1, wherein each of the plurality of mixers generates an in-phase signal and a quadrature-phase signal.

5. The wearable system of claim 1, wherein the processing unit determines a nature of a gait of a user wearing the wearable system by evaluating statistical properties of a plurality of the measurements of the inertial measurement unit over a period of multiple steps of the user and adaptively adjusting a plurality of detection parameters based on the determined nature of the gait for the duration of multiple steps.

6. The wearable system of claim 1, wherein the processing unit determines a phase of a gait of a user wearing the wearable system by evaluating at least a most recent measurement of the inertial measurement unit in real time and dynamically adjusting a plurality of detection parameters based on the determined phase of the gait occurring during a plurality of phases of a cycle of the gait.

7. The wearable system of claim 4, wherein a cross product of a two-dimensional complex-valued in-phase and quadrature components of a Fourier transform are evaluated for one or more of a plurality of frequency bins to determine at least one of speed, direction of relative motion, or size of the detected object.

8. The wearable system of claim 1, wherein the processing unit uses amplitudes of complex-valued Fourier transform arrays to determine at least one of speed, direction of relative motion, or size of the detected object.

9. The wearable system of claim 1, wherein the system further comprises a neural network trained on one or more of the plurality of low-frequency output signals and/or measurements of the inertial measurement unit to generate alerts.

10. The wearable system of claim 1, wherein the inertial measurement unit comprises one or more of an accelerometer, a gyroscope, and a magnetometer.

11. The wearable system of claim 1, wherein the local continuous RF source comprises:
a voltage controlled oscillator;
a phase detector; and
a loop filter disposed in a feedback loop.

12. The wearable system of claim 1, wherein the local continuous RF source comprises a dielectric resonator oscillator.

13. The wearable system of claim 1, where the alerts are issued using one or more of sound, light, and vibration.

14. The wearable system of claim 1, wherein alerts are transmitted to one or more user devices connected via a wireless connectivity element.

15. The wearable system of claim 7, wherein a detection threshold of the cross product is dynamically set in real time as a monotonic function of at least a most recent measurements of the inertial measurement unit.

16. The wearable system of claim 2, wherein a tapered thresholding algorithm increases sensitivity for higher-frequency components associated with fast-approaching objects.

17. The wearable system of claim 2, wherein multi-cycle peak tracking is performed to validate object detections.

18. The wearable system of claim 1, wherein the RF transmitter is pulsed on and off at different time intervals.

19. Method of detecting an approaching object, the method comprising:
generating a local continuous radio frequency (RF) source;
transmitting an RF signal synchronized to the RF source using at least one antenna element;
detecting a reflection of the RF signal from the object by a receiver that comprises at least one antenna element, and a plurality of mixers driven by and synchronized with different phases of the local continuous RF source, wherein the mixers generate a plurality of low-frequency output signals;
digitizing, using an analog-to-digital converter, the low-frequency outputs signals to form digital data;
dynamically adjusting detection thresholds based on gait-phase analysis; and
generating alerts when the approaching object is detected by a processing unit configured to execute a decision-making algorithm in accordance with the measurements of the inertial measurement unit and the digital data, wherein the processing unit is further configured to continuously adjust detection parameters.

20. A wearable approaching object detection system, comprising:
a radar comprising:
a local continuous radio frequency source generating an output;
a radio frequency transmitter configured to transmit radio frequency (RF) signals within a predefined detection zone;
a radio frequency receiver configured to receive reflected RF signals from objects within the predefined detection zone;
an accelerometer operatively connected to the system and configured to:
detect a pedestrian's motion associated with walking, running, or stationary states to generate motion data;
provide the motion data to the system to adjust sensitivity of radar in order to reduce false detections caused by the pedestrian's motion;
a processing unit operatively connected to the radar and the accelerometer, the processing unit configured to:
analyze received RF signals by the radar to identify one or more of a presence, direction, speed, size, and proximity of the approaching object;
correlate the received RF signals by radar with the detected pedestrian motion to distinguish approaching objects from background noise or stationary objects;
vary a detection sensitivity of the system or alert parameters based on the pedestrian's motion data;
a notification system configured to provide alerts to the pedestrian, wherein the alerts are generated by the processing unit, the notification system including:
a haptic feedback mechanism to vibrate upon detection of the object;
an audible or visual indicator to provide situational awareness of the detected object;
a battery configured to energize the radar transmitter, radar receiver, accelerometer, processing unit, and notification system; and
a wearable support structure adapted to be affixed to the pedestrian, wherein the support structure is ergonomically designed to enable continuous operation without impeding pedestrian mobility.

* * * * *